US009438349B2

(12) United States Patent
Ma et al.

(10) Patent No.: US 9,438,349 B2
(45) Date of Patent: Sep. 6, 2016

(54) OPTICAL MODULE, LINE CARD AND OPTICAL COMMUNICATIONS SYSTEM

(71) Applicant: Huawei Technologies Co., Ltd., Shenzhen (CN)

(72) Inventors: Yongdong Ma, Wuhan (CN); Wei Xiong, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 14/560,878

(22) Filed: Dec. 4, 2014

(65) Prior Publication Data

US 2015/0171969 A1 Jun. 18, 2015

(30) Foreign Application Priority Data

Dec. 12, 2013 (CN) .......................... 2013 1 0680765

(51) Int. Cl.

*G02B 6/00* (2006.01)
*G02B 6/42* (2006.01)
*H04B 10/40* (2013.01)
*H04J 14/02* (2006.01)

(52) U.S. Cl.

CPC ............. *H04B 10/40* (2013.01); *G02B 6/4261* (2013.01); *H04J 14/02* (2013.01)

(58) Field of Classification Search

CPC ...................................................... H04B 10/40

See application file for complete search history.

(56) References Cited

U.S. PATENT DOCUMENTS 7,466,924 B2 * 12/2008 English ................ H04B 10/801 385/14
2011/0135312 A1 * 6/2011 El-Ahmadi ........... H04L 1/0057 398/135

* cited by examiner

*Primary Examiner* — Omar R Rojas
(74) *Attorney, Agent, or Firm* — Leydig, Voit & Mayer, Ltd.

(57) ABSTRACT

Embodiments of the present invention disclose an optical module, a line card and an optical communications system, which are used to implement that the optical module is used on a line card of different service rates, so as to reduce a development cost. The optical module includes: more than two male sockets are disposed, where the more than two male sockets are configured to plug-connect to female sockets disposed on a line card, and the line card is a line card of various different service rates; and the more than two male sockets include at least one first male socket, where the first male socket is configured according to the Multisource Agreement (MSA) for a dense wavelength division multiplexing (DWDM) optical module of a 100G service rate.

10 Claims, 5 Drawing Sheets

OPTICAL MODULE, LINE CARD AND OPTICAL COMMUNICATIONS SYSTEM

CROSS-REFERENCE TO RELATED APPLICATION

This application claims priority to Chinese Patent Application No. 201310680765.X, filed on Dec. 12, 2013, which is hereby incorporated by reference in its entirety.

TECHNICAL FIELD

The present invention relates to the field of communications technologies, and in particular, to an optical module, a line card and an optical communications system.

BACKGROUND

As optical communications technologies rapidly develop, communications operators enter an era of a 100G rate. A 100G optical module (that is, optical transponder) has been standardized, and The Multisource Agreement (MSA) for a 100G long-haul dense wavelength division multiplexing (DWDM) optical module has been released. This agreement specifies that a physical bus interface of a 100G optical module is a group of OTL4.10 (OTL: Optical channel Transport Lane, 4: OTU4 service, 10: a bus consisting of 10 signal cables) signals, and this group of OTL4.10 signals, along with another power supply signal, ground signal, clock signal, and control signal, form 168 signals. The 100G optical module is connected to a 100G line card by means of cooperation between a group of 168PIN male sockets and a group of 168PIN female sockets. However, due to a limitation on the number of pins of a 168PIN socket, a group of OTL4.10 buses can no longer be added.

At the same time, an optical module is also developing towards a 200G rate. A 200G signal processing chip is used inside a 200G optical module, and this type of chip generally supports 200G and 100G services and can be configured as a 100G or 200G service rate according to a requirement. Compared with a 100G signal processing chip used in the 100G optical module, the 200G signal processing chip uses a more advanced chip processing technique and a more advanced processing algorithm, and therefore its performance is generally higher than that of the 100G signal processing chip. If a hardware interface of the 200G optical module can be compatible with 100G and can be applied on a conventional 100G line card, a smooth upgrade of the 200G optical module on the basis of the 100G optical module can be implemented, thereby saving an investment of a customer and making full use of an advantage of higher performance of the 200G processing chip.

However, according to the current 100G MSA, an optical module has only one 168PIN socket, and a group of 100G services based on an OTL4.10 signal can no longer be added, that is, a purpose for using the optical module on a line card of different service rates cannot be achieved. By using a 100G line card and a 200G line card as an example, in the prior art, a single socket with more pins may be selected to implement a 200G service, but the 100G line card and the 200G line card cannot be assembled on a 168Pin socket of the conventional 100G line card. Alternatively, a higher-performance 100G optical module may be used on the conventional 100G line card. In this case, the 200G signal processing chip needs to be used to develop a 100G optical module that uses a 168PIN socket. However, in this way, a cost of the 100G optical module is high and a price of this development manner is huge.

SUMMARY

Embodiments of the present invention provide an optical module, a line card and an optical communications system, which are used to implement that the optical module is used on the line card of different service rates, so as to reduce a development cost.

In view of this, a first aspect of the present invention provides an optical module, where the optical module may include:

more than two male sockets are disposed, where the more than two male sockets are configured to plug-connect to female sockets disposed on a line card, and the line card is a line card of various different service rates; and the more than two male sockets include at least one first male socket, where the first male socket is configured according to the MSA for a DWDM optical module of a 100G service rate.

In a first possible implementation manner of the first aspect, the male sockets further include at least one second male socket, and the number of pins of the second male socket is the same as that of the first male socket.

With reference to the first implementation manner of the first aspect, in a second possible implementation manner, a group of a physical bus transmitting and receiving signal interface, a clock signal interface and a ground signal interface is disposed on the second male socket.

With reference to the second implementation manner of the first aspect, in a third possible implementation manner, a power supply signal interface is further disposed on the second male socket.

With reference to the second implementation manner of the first aspect, in a fourth possible implementation manner, the physical bus transmitting and receiving signal interface and the clock signal interface are disposed on a side adjacent to the first male socket.

With reference to the third implementation manner of the first aspect, in a fifth possible implementation manner, the physical bus transmitting and receiving signal interface is configured as an OTL4.10 signal interface and the power supply signal interface is configured as a 12V power supply signal interface.

A second aspect of the present invention provides a line card, where more than two female sockets are disposed on the line card, and the more than two female sockets are configured to plug-connect to male sockets on an optical module; and more than two male sockets are disposed on the optical module, where the more than two male sockets are configured to plug-connect to the female sockets disposed on the line card, and the line card is a line card of various different service rates; and the more than two male sockets include at least one first male socket, where the first male socket is configured according to the MSA for a DWDM optical module of a 100G service rate.

In a first possible implementation manner of the second aspect, the male sockets further include at least one second male socket, and the number of pins of the second male socket is the same as that of the first male socket.

With reference to the first implementation manner of the second aspect, in a second possible implementation manner, a group of a physical bus transmitting and receiving signal interface, a clock signal interface and a ground signal interface is disposed on the second male socket.

With reference to the second implementation manner of the second aspect, in a third possible implementation manner, a power supply signal interface is further disposed on the second male socket.

With reference to the second implementation manner of the second aspect, in a fourth possible implementation manner, the physical bus transmitting and receiving signal interface and the clock signal interface are disposed on a side adjacent to the first male socket.

With reference to the third implementation manner of the second aspect, in a fifth possible implementation manner, the physical bus transmitting and receiving signal interface is configured as an OTL4.10 signal interface and the power supply signal interface is configured as a 12V power supply signal interface.

In a sixth implementation manner of the second aspect, the line card is a line card of different various service rates.

A third aspect of the present invention provides an optical communications system, where the system includes an optical module and a line card, the optical module may include: more than two male sockets are disposed, where the more than two male sockets are configured to plug-connect to female sockets disposed on the line card, and the line card is a line card of various different service rates; the more than two male sockets include at least one first male socket, where the first male socket is configured according to the MSA for a DWDM optical module of a 100G service rate; more than two female sockets are disposed on the line card, and the more than two female sockets are configured to plug-connect to the male sockets on the optical module; and the male sockets on the optical module correspondingly plug-connect to the female sockets on the line card.

In a first possible implementation manner of the third aspect, the male sockets further include at least one second male socket, and the number of pins of the second male socket is the same as that of the first male socket.

With reference to the first implementation manner of the third aspect, in a second possible implementation manner, a group of a physical bus transmitting and receiving signal interface, a clock signal interface and a ground signal interface is disposed on the second male socket.

With reference to the second implementation manner of the third aspect, in a third possible implementation manner, a power supply signal interface is further disposed on the second male socket.

With reference to the second implementation manner of the third aspect, in a fourth possible implementation manner, the physical bus transmitting and receiving signal interface and the clock signal interface are disposed on a side adjacent to the first male socket.

With reference to the third implementation manner of the third aspect, in a fifth possible implementation manner, the physical bus transmitting and receiving signal interface is configured as an OTL4.10 signal interface and the power supply signal interface is configured as a 12V power supply signal interface.

In a sixth possible implementation manner of the third aspect, if the optical module is an optical module of a 200G service rate, the line card is a line card of the 200G service rate, and two male sockets of the optical module of the 200G service rate correspondingly plug-connect to two female sockets of the line card of the 200G service rate, the optical communications system determines that a service mode is a 100G service mode or a 200G service mode.

It can be learned from the foregoing technical solutions that the optical module, the line card and the optical communications system provided in the embodiments of the present invention have the following advantages: more than two male sockets are disposed on the optical module, where the male sockets may plug-connect to female sockets on the line card, and the line card may include a line card of various different service rates; and the more than two male sockets include at least one first male socket, where the first male socket is configured according to the MSA for a DWDM optical module of a 100G service rate, in addition to 100G as a most basic service rate. Therefore, it may be implemented that the optical module is used on a line card of various different service rates, without remaking a processing chip of the optical module, thereby reducing a development cost.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide an optical module, a line card and an optical communications system, which are used to implement that the optical module is used on the line card of different service rates, so as to reduce a development cost.

To make the objectives, features, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Terms such as “first”, “second”, “third”, “fourth” (if exists) in the specification, the claims, and the foregoing accompanying drawings of the present invention are used to differentiate similar objects but are not necessarily used to describe a specific sequence or an order of priority. It should be understood that data used in this case is interchangeable where appropriate, so that the embodiments of the present invention described herein may be, for example, implemented in a sequence except that shown or described herein. In addition, terms "including", "having", and any other variant thereof, are intended to cover a non-exclusive inclusion, for example, a process, method, system, product, or device that includes a series of steps or units is not limited to the expressly listed steps or units, but may include other steps or units which are not expressly listed or are inherent to the process, method, product, or device.

The following describes the present invention in detail by using specific embodiments.

Figure 1A:
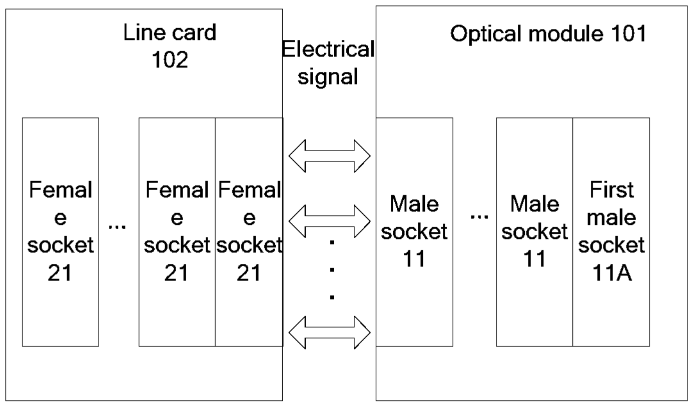
FIG. 1*a* is a schematic structural diagram of a principle of an optical module according to an embodiment of the present invention.

Referring to FIG. 1*a*, FIG. 1*a* is a schematic structural diagram of a principle of an optical module 101 according to an embodiment of the present invention, where the optical module 101 may include:

more than two male sockets 11 are disposed, where the more than two male sockets 11 are configured to plug-connect to female sockets 21 disposed on a line card 102, and the line card 102 includes a line card of various different service rates; and the more than two male sockets 11 include at least one first male socket 11A, where the first male socket 11A is configured according to the MSA for a DWDM optical module of a 100G service rate.

It may be understood that, because the first male socket 11A is configured according to the MSA for the 100G service rate, the first male socket 11A is the same as a male socket disposed on a conventional optical module of the 100G service rate and has 168 pins. The MSA specifies that a physical bus interface of a 100G optical module is a group of OTL 4.10 signals with 10 pairs of 10G electrical signals (Tx data) in a transmitting direction and 10 pairs of 10G electrical signals (Rx data) in a receiving direction, thereby forming a group of 100G services in the transmitting and receiving directions. This group of OTL4.10 signals, along with another power supply signal, ground signal, clock signal, and control signal, form 168 signals.

It may be understood that, the optical module 101 provided in this embodiment of the present invention may be installed on a conventional line card of a 100G service rate, so as to implement signal communication between the optical module 101 and the conventional line card of the 100G service rate in a manner in which the first male socket 11A of the optical module 101 plug-connects to a female socket 21 of the conventional line card of the 100G service rate. In addition, it is easy to figure out that, another male socket 11, except the first male socket 11A among the more than two male sockets 11, may cooperate with the first male socket 11A, so that the optical module 101 can plug-connect to another line card 102 of a different service rate (such as a line card of a 200G or 400G service rate), which is not specifically limited herein.

It can be learned from the foregoing description that, the optical module 101 provided in this embodiment of the present invention has the following advantages: more than two male sockets 11 are disposed on the optical module 101, where the male sockets 11 may plug-connect to female sockets 21 on a line card 102, and the line card 102 includes a line card 102 of various different service rates; in addition, the more than two male sockets 11 include at least one first male socket 11A, which is configured according to the MSA for a DWDM optical module of a 100G service rate, in addition to 100G as a most basic service rate. Therefore, it may be implemented that the optical module is used on a line card 102 of various different service rates, without remaking a processing chip of the optical module, thereby reducing a development cost.

Figure 1B:
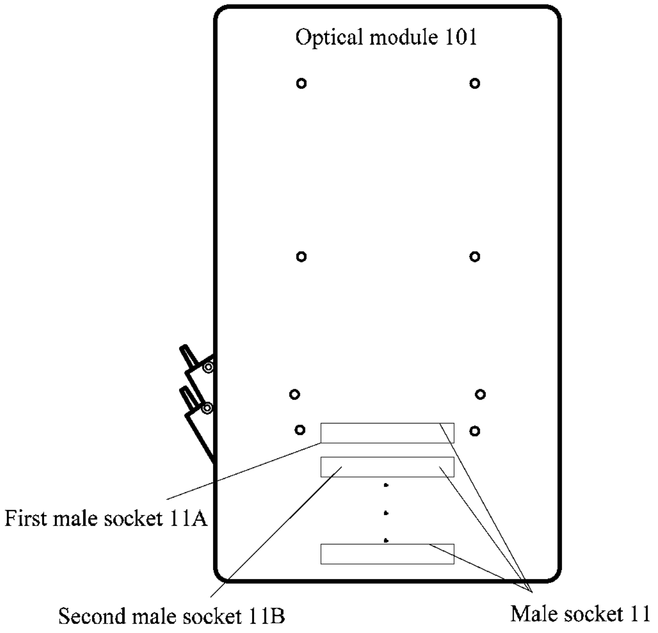
FIG. 1*b* is a schematic structural diagram of hardware of an optical module according to an embodiment of the present invention.

Preferably, the more than two male sockets 11 further include at least one second male socket 11B and the number of pins of the second male socket 11B is the same as that of the first male socket 11A. That is, the second male socket 11B also has 168 pins. If the optical module 101 includes two male sockets 11 (the first male socket 11A and the second male socket 11B), the optical module 101 is an optical module of a 200G service rate. Referring to FIG. 1*b* together, FIG. 1*b* is a schematic structural diagram of hardware of the optical module 101 according to this embodiment of the present invention.

Preferably, in this embodiment of the present invention, the second male socket 11B may perform signal allocation in the following manner a group of a physical bus transmitting and receiving signal interface, a clock signal interface, and a ground signal interface is disposed on the second male socket 11B, where the physical bus transmitting and receiving signal interface may be configured as an OTL4.10 signal interface, that is, a group of 100G services is formed.

Further, the second male socket 11B may also perform signal allocation in the following manner not only a group of a physical bus transmitting and receiving signal interface, a clock signal interface, and a ground signal interface is disposed on the second male socket 11B, but also a power supply signal interface is disposed on the second male socket 11B, where the physical bus transmitting and receiving signal interface may be configured as an OTL4.10 signal interface, and the power supply signal interface may be configured as a 12V power supply signal interface, so as to meet a requirement for providing a larger current for an optical module of a high service rate (such as a 200G optical module or a 400G optical module) when the optical module of the high service rate works.

It may be understood that, specific positions at which the physical bus transmitting and receiving signal interface, the clock signal interface, the ground signal interface, and the power supply signal interface are disposed on the second male socket 11B are not specifically limited in this embodiment of the present invention.

Preferably, the physical bus transmitting and receiving signal interface and the clock signal interface may be disposed on a side adjacent to the first male socket 11A. In this way, a problem that quality of a signal is poor because the signal is near an edge of an optical module can be solved.

It can be learned from the foregoing description that, more than two male sockets 11 are disposed on the optical module 101 provided in this embodiment of the present invention, where the male sockets 11 may plug-connect to female sockets 21 on a line card 102, and the line card 102 includes a line card of various different service rates; in addition, the more than two male sockets 11 include at least one first male socket 11A, and the first male socket 11A is configured according to the MSA for a DWDM optical module of a 100G service rate, in addition to 100G as a most basic service rate. Therefore, it may be implemented that the optical module is used on a line card 102 of various different service rates, without remaking a processing chip of the optical module, thereby reducing a development cost.

In order to better implement the optical module provided in this embodiment of the present invention, this embodiment of the present invention further provides a line card and a related system that cooperate with the foregoing optical module. Meanings of nouns are the same as those in the foregoing optical module embodiment. For specific implementation details, reference may be made to the description in the optical module embodiment.

Figure 2:
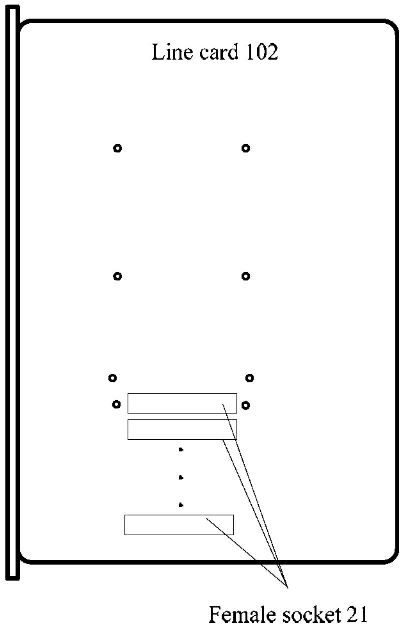
FIG. 2 is a schematic structural diagram of hardware of a line card according to an embodiment of the present invention.

Corresponding to the optical module 101 provided in the foregoing embodiment, an embodiment of the present invention further provides a line card 102. Referring to FIG. 2 together, FIG. 2 is a schematic structural diagram of hardware of the line card 102, where more than two female sockets 21 are disposed on the line card 102, and the more than two female sockets 21 are configured to correspondingly plug-connect to male sockets 11 on an optical module. The optical module is the optical module 101 described in the foregoing embodiment.

As shown in FIG. 1*a* and FIG. 1*b*, the optical module 101 may include that: more than two male sockets 11 are disposed, where the more than two male sockets 11 are configured to plug-connect to the female sockets 21 disposed on the line card 102, and the line card 102 includes a line card of various different service rates; and the more than two male sockets 11 include at least one first male socket 11A, where the first male socket 11A is configured according to the MSA for a DWDM optical module of a 100G service rate.

The more than two male sockets 11 further include at least one second male socket 11B, and the number of pins of the second male socket 11B is the same as that of the first male socket 11A.

Preferably, in this embodiment of the present invention, the second male socket 11B may perform signal allocation in the following manner a group of a physical bus transmitting and receiving signal interface, a clock signal interface, and a ground signal interface is disposed on the second male socket 11B, where the physical bus transmitting and receiving signal interface may be configured as an OTL4.10 signal interface, that is, a group of 100G services is formed.

Further, the second male socket 11B may also perform signal allocation in the following manner not only a group of a physical bus transmitting and receiving signal interface, a clock signal interface, and a ground signal interface is disposed on the second male socket 11B, but also a power supply signal interface is disposed on the second male socket 11B, where the physical bus transmitting and receiving signal interface may be configured as an OTL4.10 signal interface, and the power supply signal interface may be configured as a 12V power supply signal interface, so as to meet a requirement for providing a larger current for an optical module of a high service rate (such as a 200G optical module or a 400G optical module) when the optical module of the high service rate works.

Preferably, the physical bus transmitting and receiving signal interface and the clock signal interface may be disposed on a side adjacent to the first male socket 11A. In this way, a problem that quality of a signal is poor because the signal is near an edge of an optical module can be solved.

It may be understood that, for a specific structure setting and socket configuration of the optical module 101, reference may be made to the related description in the foregoing embodiment, and details are not described herein again.

The line card 102 may be a line card of various different service rates, such as a line card of a 200G service rate or a line card of a 400G service rate, and can implement plug-connection to an optical module on which more than two male sockets are disposed.

For example, if two male sockets 11 (a first male socket 11A and a second male socket 11B) are disposed on the optical module 101, the optical module 101 is an optical module of a 200G service rate, and the optical module of the 200G service rate may be installed on a conventional line card of a 100G service rate or a line card of a 200G service rate; if four male sockets 11 (one first male socket 11A and three second male sockets 11B) are disposed on the optical module 101, the optical module 101 is an optical module of a 400G service rate, and the optical module of the 400G service rate may be installed on a conventional line card of a 100G service rate, a line card of a 200G service rate, and a line card of a 400G service rate.

If the line card is a line card of a 200G service rate, two female sockets 21 are disposed on the line card of the 200G service rate and the two female sockets 21 are a first female socket and a second female socket. If the optical module of the 200G service rate is installed on the line card of the 200G service rate, the first female socket plug-connects to the first male socket 11A disposed at a position corresponding to that of the first female socket, and the second female socket plug-connects to the second male socket 11B disposed at a position corresponding to that of the second female socket. It should be noted that, the first female socket is disposed in the same way as a female socket on a conventional line card of a 100G service rate.

The optical module 101 and the line card 102 that are provided in the embodiments of the present invention are used together by means of cooperation, and therefore, the present invention further provides an optical communications system, where the system includes an optical module and a line card, where the optical module is the optical module 101 described in the foregoing embodiment and the line card is the line card 102 described in the foregoing embodiment. Male sockets 11 on the optical module 101 correspondingly plug-connect to female sockets 21 on the line card 102.

Further, if the optical module 101 is an optical module of a 200G service rate, the line card 102 is a line card of a 200G service rate, and two male sockets 11 of the optical module of the 200G service rate correspondingly plug-connect to two female sockets 21 of the line card of the 200G service rate, the optical communications system determines that a service mode is a 100G service mode or a 200G service mode.

In this implementation manner, when the optical module of the 200G service rate is installed on the line card of the 200G service rate, a first male socket 11A of the optical module of the 200G service rate plug-connects to a female socket (such as a first female socket) disposed at a position, corresponding to that of the first male socket 11A, on the line card of the 200G service rate. Because two female sockets are disposed on the line card of the 200G service rate, a second male socket 11B may plug-connect to the other female socket (such as a second female socket) disposed at a position, corresponding to that of the second male socket 11B, on the line card of the 200G service rate. When the optical module of the 200G service rate enables the second male socket 11B, a signal connection is formed between the second male socket 11B and the second female socket of the line card of the 200G service rate, and therefore, the optical communications system may determine that the service mode is a 200G service mode; when the optical module of the 200G service rate disables the second male socket 11B, a signal connection is not formed between the second male socket 11B and the second female socket of the line card of the 200G service rate, and therefore, the optical communications system may determine that the service mode is a 100G service mode.

It should be noted that, the optical module 101 may be installed on a conventional line card of a 100G service rate, that is, if in the optical communications system, the optical module 101 is an optical module of a 200G service rate, the optical module may be installed on the conventional line card of the 100G service rate, where a first male socket 11A of the optical module of the 200G service rate plug-connects to a female socket of the conventional line card of the 100G service rate, and therefore, the optical communications system may determine that the service mode is a 100G service mode.

In this implementation manner, when the first male socket 11A of the optical module of the 200G service rate plug-connects to the female socket of the conventional line card of the 100G service rate, because only one female socket is disposed on the conventional line card of the 100G service rate, a signal connection is not formed between a second male socket 11B and the line card of the 100G service rate, and therefore, the optical communications system may determine that the service mode is a 100G service mode.

In order to help understand the optical module, the line card and the optical communications system that are provided in the embodiments of the present invention, the following analyzes and describes setting and a working principle of the optical module by using an optical module of a 200G service rate as an example.

In the following description, an optical module of a 200G service rate is referred to as a 200G optical module for short; a line card of a 100G service rate is referred to as a 100G line card for short; and a line card of a 200G service rate is referred to as a 200G line card for short. Two male sockets 11 are disposed on the 200G optical module, where the two male sockets 11 are configured to correspondingly plug-connect to female sockets 21 on the 100G line card or the 200G line card, so as to implement that the optical module is used on the 100G line card and the 200G line card.

Figure 3A:
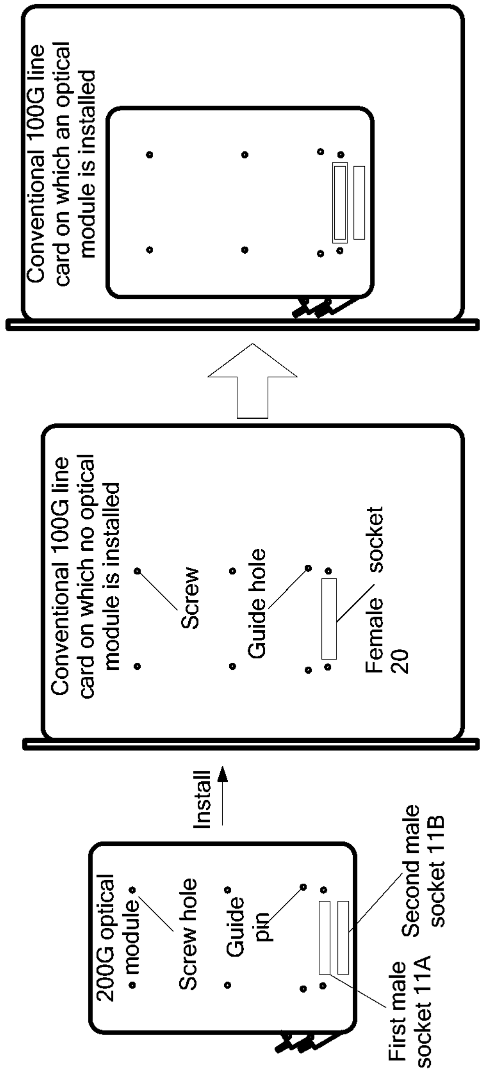
FIG. 3*a* is a schematic structural diagram of an optical communications system according to an embodiment of the present invention.

The two male sockets 11 are a first male socket 11A and a second male socket 11B, where the first male socket 11A is configured according to the MSA for a DWDM optical module of a 100G service rate; the second male socket 11B is disposed near the first male socket 11A, and may be disposed under the first male socket 11A. As shown in FIG. 3*a*, FIG. 3*a* is a schematic structural diagram of the optical communications system in this embodiment. In addition, the number of pins of the second male socket 11B is the same as that of the first male socket 11A, that is, they are both a 168PIN socket.

Currently, bus interfaces of the 200G optical module are generally two groups of OTL4.10 signals, the two groups of OTL4.10 signals form two groups of 100G services. In this embodiment of the present invention, one group of OTL4.10 signal bus is connected by means of the first male socket 11A, and the other group of OTL4.10 signal bus is connected by means of the second male socket 11B, which does not conflict with a signal definition and a position of the first male socket 11A, thereby implementing compatibility with the 100G line card.

The 200G optical module may be used on a conventional 100G line card and the 200G line card provided in this embodiment. Because only one 168PIN socket (that is, only one female socket, marked as a female socket 20) is disposed on the conventional 100G line card, the first male socket of the 200G optical module is disposed at a position corresponding to that of the female socket. Two 168PIN sockets (that is, two female sockets) are disposed on the 200G line card, and the two female sockets may be marked as a first female socket 21A and a second female socket 21B, where the first female socket 21A is disposed at a position corresponding to that of the first male socket 11A of the 200G optical module and the second female socket 21B is disposed at a position corresponding to that of the second male socket 11B. The following analyzes a service mode and signal allocation for the 200G optical module.

In a first service mode, referring to FIG. 3*a*, the 200G optical module may be installed on the conventional 100G line card by means of cooperation between a screw hole disposed on the 200G optical module and a screw disposed on the 100G line card, and cooperation between a guide pin disposed on the 200G optical module and a guide hole disposed on the 100G line card. In this mode, the first male socket 11A of the 200G optical module plug-connects to the female socket 20 of the 100G line card. Because only one female socket 20 is disposed on the 100G line card, a signal connection is not formed between the second male socket 11B and the 100G line card, and therefore, it may be determined that the service mode is a 100G service mode.

Figure 3B:
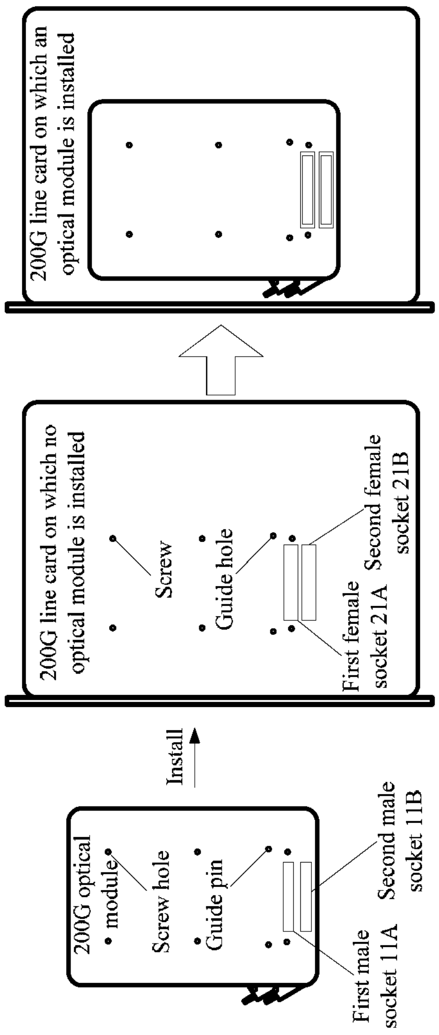
FIG. 3*b* is another schematic structural diagram of an optical communications system according to an embodiment of the present invention.

In a second service mode, referring to FIG. 3*b*, FIG. 3*b* is another schematic structural diagram of the optical communications system. The 200G optical module may be installed on the 200G line card by means of cooperation between a screw hole disposed on the 200G optical module and a screw disposed on the 200G line card, and cooperation between a guide pin disposed on the 200G optical module and a guide hole disposed on the 200G line card. In this mode, the first male socket 11A of the 200G optical module plug-connects to the first female socket 21A disposed at a position, corresponding to that of the first male socket 11A, on the 200G line card. Because two female sockets are disposed on the 200G line card, the second male socket 11B plug-connects to the other female socket (the second female socket 21B) of the 200G line card. When the 200G optical module enables the second male socket 11B, a signal connection is formed between the second male socket 11B and the second female socket 21B of the 200G line card, and therefore, it may be determined that the service mode is a 200G service mode.

In a third service mode, as shown in FIG. 3*b*, when the 200G optical module disables the second male socket 11B, a signal connection is not formed between the second male socket 11B and the second female socket 21B of the 200G line card, and therefore, it may be determined that the service mode is a 100G service mode.

Based on the 200G optical module, the second male socket 11B disposed on the 200G optical module may perform signal allocation in the following two manners:

A group of 100G service signals (such as OTL4.10 signals) is allocated to the second male socket 11B, to form a 200G service (such as two groups of OTL4.10 signals) along with the first male socket 11A. In addition, only signals such as a 12V power supply signal and an RXMOCK clock signal that are related to a newly added 100G service may be set on the second male socket 11B.

In one type of signal allocation, only one group of a physical bus transmitting and receiving signal interface, a clock signal interface and a ground signal interface is disposed on the second male socket 11B, that is, only an OTL4.10 signal, an RXMONCK clock signal, and a GND ground signal are allocated to the second male socket 11B. Referring to Table 1 together, Table 1 shows a signal allocation manner of the two male sockets of the 200G optical module.

TABLE 1

| | Second male socket 11B | | First male socket 11A | |
|---|---|---|---|---|
| | Column B | Column A | Column B | Column A |
| 84 | GND | GND | 12 V | 12 V |
| 83 | GND | RX0n | 12 V | 12 V |
| 82 | GND | RX0p | 12 V | 12 V |
| 81 | GND | GND | 12 V_GND | 12 V_GND |
| 80 | GND | RX1n | 12 V_GND | 12 V_GND |
| 79 | GND | RX1p | 12 V_GND | 12 V_GND |
| 78 | GND | GND | GND | MOD_ABS |
| 77 | GND | RX2n | TXMONCKn | GND |
| 76 | GND | RX2p | GND | RXMONCKAn |
| 75 | GND | GND | TXMONCKp | GND |
| 74 | GND | GND | GND | RXMONCKAp |
| 73 | GND | RX3n | TXA0n | GND |
| 72 | GND | RX3p | GND | RXA0n |
| 71 | GND | GND | TXA0p | GND |
| 70 | GND | GND | GND | RXA0p |
| 69 | GND | GND | TXA1n | GND |
| 68 | GND | GND | GND | RXA1n |
| 67 | GND | RX4n | TXA1p | GND |
| 66 | GND | RX4p | GND | RXA1p |
| 65 | GND | GND | TXA2n | GND |
| 64 | GND | GND | GND | RXA2n |
| 63 | GND | GND | TXA2p | GND |
| 62 | GND | RX5n | GND | RXA2p |
| 61 | GND | RX5p | TXA3n | GND |
| 60 | GND | GND | GND | RXA3n |
| 59 | GND | GND | TXA3p | GND |
| 58 | GND | GND | GND | RXA3p |
| 57 | GND | RX6n | TXA4n | GND |
| 56 | GND | RX6p | GND | RXA4n |
| 55 | GND | GND | TXA4p | GND |
| 54 | GND | GND | GND | RXA4p |
| 53 | GND | GND | TXA5n | GND |
| 52 | GND | GND | GND | RXA5n |
| 51 | GND | RX7n | TXA5p | GND |
| 50 | GND | RX7p | GND | RXA5p |
| 49 | GND | GND | TXA6n | GND |
| 48 | GND | GND | GND | RXA6n |
| 47 | GND | GND | TXA6p | GND |
| 46 | GND | RX8n | GND | RXA6p |
| 45 | GND | RX8p | TXA7n | GND |
| 44 | GND | GND | GND | RXA7n |
| 43 | GND | GND | TXA7p | GND |
| 42 | GND | GND | GND | RXA7p |
| 41 | GND | GND | TXA8n | GND |
| 40 | GND | RX9n | GND | RXA8n |
| 39 | GND | RX9p | TXA8p | GND |
| 38 | GND | GND | GND | RXA8p |
| 37 | GND | GND | TXA9n | GND |
| 36 | GND | GND | GND | RXA9n |
| 35 | GND | RXMONCKBn | TXA9p | GND |
| 34 | GND | RXMONCKBp | GND | RXA9p |
| 33 | GND | GND | TXDSCn | GND |
| 32 | GND | GND | GND | RXDSCn |
| 31 | GND | GND | TXDSCp | GND |
| 30 | GND | TX0n | GND | RXDSCp |
| 29 | GND | TX0p | REFCLKn | GND |
| 28 | GND | GND | GND | MDIO |
| 27 | GND | TX1n | REFCLKp | MDC |
| 26 | GND | TX1p | GND | GND |
| 25 | GND | GND | PRTADR4 | VND_IO_A |
| 24 | GND | TX2n | PRTADR3 | VND_IO_B |
| 23 | GND | TX2p | PRTADR2 | VND_IO_C |
| 22 | GND | GND | PRTADR1 | VND_IO_D |
| 21 | GND | TX3n | PRTADR0 | GND |
| 20 | GND | TX3p | PRG_CNTL1 | VND_IO_E |
| 19 | GND | GND | PRG_CNTL2 | VND_IO_F |
| 18 | GND | TX4n | PRG_CNTL3 | VND_IO_G |
| 17 | GND | TX4p | GND | VND_IO_H |
| 16 | GND | GND | PRG_ALRM1 | GND |
| 15 | GND | TX5n | PRG_ALRM2 | VND_IO_J |
| 14 | GND | TX5p | PRG_ALRM3 | VND_IO_K |
| 13 | GND | GND | PM_SYNC | FFU |
| 12 | GND | TX6n | GND | FFU |
| 11 | GND | TX6p | TX_DIS | FFU |
| 10 | GND | GND | MOD_LOPWR | 12 V |
| 9 | GND | TX7n | MOD_RSTn | 12 V |

TABLE 1-continued

| | Second male socket 11B | | First male socket 11A | |
|---|---|---|---|---|
| | Column B | Column A | Column B | Column A |
| 8 | GND | TX7p | RX_LOS | 12 V |
| 7 | GND | GND | GLB_ALRMn | 12 V |
| 6 | GND | TX8n | 12 V_GND | 12 V_GND |
| 5 | GND | TX8p | 12 V_GND | 12 V_GND |
| 4 | GND | GND | 12 V_GND | 12 V_GND |
| 3 | GND | TX9n | 12 V | 12 V |
| 2 | GND | TX9p | 12 V | 12 V |
| 1 | GND | GND | 12 V | 12 V |

It may be understood that, Table 1 shows a schematic table for allocating 168 signals of the two male sockets of the 200G optical module. The first male socket 11A is configured according to the 100G MSA. In the second male socket 11B, signals ranging from RX0n to RX9n and from RX0p to RX9p in Column A are 10 pairs of 10G electrical signals in a receiving direction, and signals ranging from TX0n to TX9n and from TX0p to TX9p are 10 pairs of 10G electrical signals in a transmitting direction, 10 pairs of 10G electrical signals in the receiving direction and 10 pairs of 10G electrical signals in the transmitting direction forms a group of OTL4.10 signals in the transmitting and receiving directions; RXMONCKBn and RXMONCKBp are a group of RXMONCK clock signals; other signals in Column A are all GND ground signals; and signals in Column B are all GND ground signals.

Preferably, the OTL4.10 signal interface (the physical bus transmitting and receiving signal interface) and an RXMONCK clock signal interface may be disposed on a side adjacent to the first male socket 11A, as shown in FIG. 3*a* or FIG. 3*b*. In this way, a problem that quality of a signal is poor because the signal is near an edge of an optical module can be solved.

In the other type of signal allocation, not only an OTL4.10 signal, an RXMONCK clock signal and a GND ground signal are allocated to the second male socket 11B, but also a 12V power supply signal is allocated to the second male socket 11B. Referring to Table 2 together, Table 2 shows the other signal allocation manner of the two male sockets of the 200G optical module.

TABLE 2

| | Second male socket 11B | | First male socket 11A | |
|---|---|---|---|---|
| | Column B | Column A | Column B | Column A |
| 84 | 12 V | GND | 12 V | 12 V |
| 83 | 12 V | RX0n | 12 V | 12 V |
| 82 | 12 V | RX0p | 12 V | 12 V |
| 81 | GND | GND | 12 V_GND | 12 V_GND |
| 80 | GND | RX1n | 12 V_GND | 12 V_GND |
| 79 | GND | RX1p | 12 V_GND | 12 V_GND |
| 78 | GND | GND | GND | MOD_ABS |
| 77 | GND | RX2n | TXMONCKn | GND |
| 76 | GND | RX2p | GND | RXMONCKAn |
| 75 | GND | GND | TXMONCKp | GND |
| 74 | GND | GND | GND | RXMONCKAp |
| 73 | GND | RX3n | TXA0n | GND |
| 72 | GND | RX3p | GND | RXA0n |
| 71 | GND | GND | TXA0p | GND |
| 70 | GND | GND | GND | RXA0p |
| 69 | GND | GND | TXA1n | GND |
| 68 | GND | GND | GND | RXA1n |
| 67 | GND | RX4n | TXA1p | GND |
| 66 | GND | RX4p | GND | RXA1p |
| 65 | GND | GND | TXA2n | GND |
| 64 | GND | GND | GND | RXA2n |

TABLE 2-continued

| | Second male socket 11B | | First male socket 11A | |
|---|---|---|---|---|
| | Column B | Column A | Column B | Column A |
| 63 | GND | GND | TXA2p | GND |
| 62 | GND | RX5n | GND | RXA2p |
| 61 | GND | RX5p | TXA3n | GND |
| 60 | GND | GND | GND | RXA3n |
| 59 | GND | GND | TXA3p | GND |
| 58 | GND | GND | GND | RXA3p |
| 57 | GND | RX6n | TXA4n | GND |
| 56 | GND | RX6p | GND | RXA4n |
| 55 | GND | GND | TXA4p | GND |
| 54 | GND | GND | GND | RXA4p |
| 53 | GND | GND | TXA5n | GND |
| 52 | GND | GND | GND | RXA5n |
| 51 | GND | RX7n | TXA5p | GND |
| 50 | GND | RX7p | GND | RXA5p |
| 49 | GND | GND | TXA6n | GND |
| 48 | GND | GND | GND | RXA6n |
| 47 | GND | GND | TXA6p | GND |
| 46 | GND | RX8n | GND | RXA6p |
| 45 | GND | RX8p | TXA7n | GND |
| 44 | GND | GND | GND | RXA7n |
| 43 | GND | GND | TXA7p | GND |
| 42 | GND | GND | GND | RXA7p |
| 41 | GND | GND | TXA8n | GND |
| 40 | GND | RX9n | GND | RXA8n |
| 39 | GND | RX9p | TXA8p | GND |
| 38 | GND | GND | GND | RXA8p |
| 37 | GND | GND | TXA9n | GND |
| 36 | GND | GND | GND | RXA9n |
| 35 | GND | RXMONCKBn | TXA9p | GND |
| 34 | GND | RXMONCKBp | GND | RXA9p |
| 33 | GND | GND | TXDSCn | GND |
| 32 | GND | GND | GND | RXDSCn |
| 31 | GND | GND | TXDSCp | GND |
| 30 | GND | TX0n | GND | RXDSCp |
| 29 | GND | TX0p | REFCLKn | GND |
| 28 | GND | GND | GND | MDIO |
| 27 | GND | TX1n | REFCLKp | MDC |
| 26 | GND | TX1p | GND | GND |
| 25 | GND | GND | PRTADR4 | VND_IO_A |
| 24 | GND | TX2n | PRTADR3 | VND_IO_B |
| 23 | GND | TX2p | PRTADR2 | VND_IO_C |
| 22 | GND | GND | PRTADR1 | VND_IO_D |
| 21 | GND | TX3n | PRTADR0 | GND |
| 20 | GND | TX3p | PRG_CNTL1 | VND_IO_E |
| 19 | GND | GND | PRG_CNTL2 | VND_IO_F |
| 18 | GND | TX4n | PRG_CNTL3 | VND_IO_G |
| 17 | GND | TX4p | GND | VND_IO_H |
| 16 | GND | GND | PRG_ALRM1 | GND |
| 15 | GND | TX5n | PRG_ALRM2 | VND_IO_J |
| 14 | GND | TX5p | PRG_ALRM3 | VND_IO_K |
| 13 | GND | GND | PM_SYNC | FFU |
| 12 | GND | TX6n | GND | FFU |
| 11 | GND | TX6p | TX_DIS | FFU |
| 10 | GND | GND | MOD_LOPWR | 12 V |
| 9 | GND | TX7n | MOD_RSTn | 12 V |
| 8 | GND | TX7p | RX_LOS | 12 V |
| 7 | GND | GND | GLB_ALRMn | 12 V |
| 6 | GND | TX8n | 12 V_GND | 12 V_GND |
| 5 | GND | TX8p | 12 V_GND | 12 V_GND |
| 4 | GND | GND | 12 V_GND | 12 V_GND |
| 3 | GND | TX9n | 12 V | 12 V |
| 2 | GND | TX9p | 12 V | 12 V |
| 1 | GND | GND | 12 V | 12 V |

Similarly, Table 2 shows a schematic table for allocating 168 signals of the two male sockets of the 200G optical module. The first male socket 11A is configured according to the 100G MSA. In the second male socket 11B, signals ranging from RX0n to RX9n and from RX0p to RX9p in Column A are 10 pairs of 10G electrical signals in a receiving direction, and signals ranging from TX0n to TX9n and from TX0p to TX9p are 10 pairs of 10G electrical signals in a transmitting direction, 10 pairs of 10G electrical signals in the receiving direction and 10 pairs of 10G electrical signals in the transmitting direction forms a group of OTL4.10 signals in the transmitting and receiving directions; RXMONCKBn and RXMONCKBp are a group of RXMONCK clock signals; other signals are in Column A all GND ground signals. A difference from Table 1 lies in that, three 12V power supply signals are allocated in Column B in Table 2, and other signals are all GND ground signals.

Preferably, the OTL4.10 signal interface (the physical bus transmitting and receiving signal interface) and an RXMONCK clock signal interface may be disposed on a side adjacent to the first male socket 11A, as shown in FIG. 3*a* or FIG. 3*b*. In this way, a problem that quality of a signal is poor because the signal is near an edge of an optical module can be solved. It may be understood that, the 12V power supply signal can meet a requirement for providing a larger current for the 200G optical module when the 200G optical module works. In addition, in order to avoid impact of the 12V power supply signal of the second male socket 11B on the OTL4.10 signals and the RXMONCK clock signals, the 12V power supply signal is set in Column B.

It should be noted that, in this embodiment of the present invention, only the foregoing two signal allocation manners are used to describe the working principle of the optical module, which however, does not impose a limitation on the present invention.

In addition, in an arranging mode shown in FIG. 3*a* or FIG. 3*b*, a distance between the first male socket 11A and the second male socket 11B may range from 10 mm to 15 mm, preferably 13 mm, which however, does not impose a limitation on the present invention.

It can be learned from the foregoing description that, the 200G optical module may be used on a 200G line card and a 100G line card. Because performance of a processing chip of the 200G optical module is higher than that of a processing chip of a 100G optical module, system performance of the 100G line card can be improved when the 200G optical module works in a 100G mode; when the 200G optical module is installed and works on the conventional 100G line card, it is unnecessary to design, by means of the processing chip of the 200G optical module, a 100G optical module that uses a 168PIN socket, so that a cost can be reduced. In addition, because a shape of the 200G optical module is consistent with a shape of a conventional 100G optical module, a smooth upgrade from 100G to 200G optical communications technology can be implemented, thereby reducing a revision and an upgrade of the 100G line card that are caused by a change in a shape and an interface of the optical module.

It is easy to figure out that, in this embodiment of the present invention, only the 200G optical module is used as an example for description, and the structural setting, the service mode, the signal allocation, and the like are also applicable to an optical module of another service rate. The example herein does not impose a limitation on the present invention.

In the foregoing embodiments, the descriptions of the embodiments have their respective focuses. For a part that is not described in detail in an embodiment, reference may be made to related descriptions in other embodiments, and details are not described herein again.

The optical module, the line card and the optical communications system that are provided in the embodiments of the present invention are described in detail in the foregoing. Specific examples are used in this specification to describe the principle and implementation manners of the present invention. The foregoing descriptions of the embodiments are merely intended to help understand the method of the present invention and its core ideas. In addition, a person of ordinary skill in the art may make variations to the specific implementation manners and application scope according to the ideas of the present invention. In conclusion, the content of this specification shall not be understood as a limitation on the present invention.

What is claimed is:

1. An optical module in an optical communications system comprising:

a quantity of N connectors, configured to interface with corresponding connectors of line cards having different service rates, wherein N is a positive integer larger or equal to 2;

wherein the N connectors comprise a first connector configured according to a Multisource Agreement (MSA) for a dense wavelength division multiplexing (DWDM) optical module of a 100G service rate, and each of remaining N−1 connectors comprises same quantity of pins as that of the first connector;

a processing chip, configured to enable the remaining N−1 connectors, to switch the optical communication system to a $2^{N-1}\times$100G service mode.

2. The optical module according to claim 1, wherein each of the remaining N−1 connectors further comprises:

a physical bus transmitting and receiving signal interface, a clock signal interface and a ground signal interface.

3. The optical module according to claim 2, wherein each of the remaining N−1 connectors further comprises:

a power supply signal interface.

4. The optical module according to claim 2, wherein:

the physical bus transmitting and receiving signal interface and the clock signal interface are disposed on a side adjacent to the first connector.

5. The optical module according to claim 3, wherein:

the physical bus transmitting and receiving signal interface is configured as an OTL4.10 signal interface and the power supply signal interface is configured as a 12V power supply signal interface.

6. A system, comprising at least one line card and an optical module, wherein:

the at least one line card having different service rates comprises at least two connectors, configured to interface with a quantity of N connectors on the optical module, wherein N is a positive integer larger or equal to 2; and wherein the N connectors of the optical module comprise a first connector configured according to a Multisource Agreement (MSA) for a dense wavelength division multiplexing (DWDM) optical module of a 100G service rate, and each of remaining N−1 connectors comprises same quantity of pins as that of the first connector;

wherein the optical module comprises a processing chip, configured to enable the remaining N−1 connectors, to switch the optical communication system to a $2^{N-1}\times$100G service mode.

7. The system according to claim 6, wherein each of the remaining N−1connectors further comprises:

a physical bus transmitting and receiving signal interface, a clock signal interface and a ground signal interface.

8. The system according to claim 7, wherein each of the remaining N−1connectors further comprises:

a power supply signal interface.

9. The system according to claim 7, wherein:

the physical bus transmitting and receiving signal interface and the clock signal interface are disposed on a side adjacent to the first connector.

10. The system according to claim 7, wherein:

the physical bus transmitting and receiving signal interface is configured as an OTL4.10 signal interface and the power supply signal interface is configured as a 12V power supply signal interface.

* * * * *